(12) United States Patent
Johansson

(10) Patent No.: US 6,189,585 B1
(45) Date of Patent: Feb. 20, 2001

(54) SINGLE-GRIP HARVESTER HEAD FOR FELLING AND PROCESSING OF TREES

(75) Inventor: Anders Johansson, Ryssby (SE)

(73) Assignee: SP-Maskiner AB, Ljungby (SE)

( * ) Notice: Under 35 U.S.C. 154(b), the term of this patent shall be extended for 0 days.

(21) Appl. No.: 09/453,454

(22) Filed: Dec. 3, 1999

Related U.S. Application Data

(63) Continuation of application No. PCT/SE98/00923, filed on May 18, 1998.

(30) Foreign Application Priority Data

Jun. 4, 1997 (SE) .................................... 9702105

(51) Int. Cl.[7] ........................... A01G 23/08; B27B 25/02; B27B 31/00
(52) U.S. Cl. .................... 144/248.5; 144/4.1; 144/246.1; 144/248.4; 144/335
(58) Field of Search ................. 144/4.1, 24.13, 144/242.1, 246.1, 249.4, 248.5, 335, 336, 338

(56) References Cited

FOREIGN PATENT DOCUMENTS

| 455 283 | 7/1988 | (SE) . |
|---|---|---|
| 463 591 | 12/1990 | (SE) . |
| 93/19909 | 10/1993 | (WO) . |

*Primary Examiner*—W. Donald Bray
(74) *Attorney, Agent, or Firm*—Vorys, Sater, Seymour and Pease LLP

(57) ABSTRACT

A single-grip harvester head comprises a frame (1, 2), which defines a tree feeding path, and two feeding roller arms (5), which are pivotable in relation to the frame (1, 2) about a pivot axis (A1) each defined by a pivot pin (6) and which support a rotatable feeding roller (7) each. Each feeding roller arm (5) is formed as an angular lever with two lever legs (5a, 5b), the feeding roller (7) being supported at the free end of one of the legs (5a) and the pivot pin (6) of the feeding roller arm (5) being positioned in the angular area between the legs. The two pivot axes (A1) are located in a common plane perpendicular to the tree feeding path. Each pivot pin (6) is articulated to the frame (1, 2) at one of its ends by means of a ball joint (13) and controlled at its other end, in such a way that the pivot axis (A1) is movable in said plane but fixed in a direction perpendicular to this plane. The other leg (5b) of each feeding roller arm (5) is articulated to a slide (17) by means of a ball joint (16), which slide is reciprocatable in the direction of the tree feeding path in relation to the frame (1, 2) to maintain, in the pivoting of the feeding roller arms (5), a constant distance between the ball joints (16) by means of which the arms (5) are articulated to the slide (17).

7 Claims, 5 Drawing Sheets

SINGLE-GRIP HARVESTER HEAD FOR FELLING AND PROCESSING OF TREES

This application is a continuation of Application No. PCT/SE98/00923, filed May 18, 1998.

The present invention relates to a single-grip harvester head for felling and processing of trees, which comprises a frame, which is adapted to be mounted on a forestry machine and which defines a tree feeding path, two feeding roller arms arranged one on each side of this path, each of which is pivotable in relation to the frame about a pivot axis defined by a pivot pin, and two feeding rollers, each of which is supported by a feeding roller arm and is rotatable about a rotation axis parallel to the pivot axis of the respective arm, the feeding rollers being movable, by the pivoting of the feeding roller arms, towards or away from the tree feeding path in order to be able to grip and feed trees with various stem diameters along this path.

Single-grip harvester heads of this type are known in many different embodiments. In addition to the above-mentioned feeding rollers and feeding roller arms, the single-grip harvester heads also comprise two sets of limbing knives arranged at a distance from each other along the tree feeding path. Each set usually comprises three knives, of which one is fixed and two are movable and which jointly surround the tree stem.

The movable limbing knives, which are hydraulically driven, press the tree stem against the fixed limbing knife, the press power exerted by the movable limbing knives having to be greater the heavier the tree stem. To control this, the diameter of the tree stem is continually measured and the hydraulic pressure is controlled by means of control and computer equipment in such a way that the press power increases as the stem diameter increases. In this connection, it is essential that the press power should not become too great since an increased press power causes an increased friction between the limbing knives and the tree stem and, thus, an increase of the charge on the feeding rollers as the tree feeding power increases. For this reason, it is essential that it should be possible to measure the diameter in a precise way. A precise measuring of the diameter is also essential because the optimisation of the marking for cross-cutting calculated by the computer equipment is based on the stem diameter. While measuring the diameter in a precise manner, the tree stem must be correctly positioned in the nip between the limbing knives. Among other things it must properly engage the breast formed by, for instance, the fixed limbing knives. However, this is not always the case since the movable limbing knives sometimes tend to "bounce" back somewhat as a consequence of the weight of the tree stem. To remedy this, the feeding roller arms in some types of harvester heads are designed in such a way that the feeding rollers when pivoting towards a tree stem are slightly adjusted angularly to partly surround the tree stem and thereby relieve the movable limbing knives of the load. In these constructions, this angular adjustment is not only made about an axis parallel to the tree feeding path but also about an additional axis, which makes the feeding rollers strive to press the tree stem out from the breast when feeding the tree in one or the other direction.

A principal object of the present invention is to provide a single-grip harvester head, in which this drawback is obviated and which in a simple way permits a well adapted angular adjustment of the feeding rollers.

According to the invention this object is achieved with a single-grip harvester head of the type mentioned by way of introduction, characterised in that:

- each feeding roller arm is formed as an angular lever having two lever legs, the feeding roller being supported at the free end of one of the legs and the pivot pin of the feeding roller arm being positioned in the angular area joining the legs;
- the two pivot axes are located in a common plane perpendicular to the tree feeding path;
- the pivot pin of each feeding roller arm at one of its ends is articulated to the frame by means of a joint about an axis perpendicular to said plane and at its other end is controlled by a control means fixedly connected to the frame, in such a way that the pivot axis is movable in said plane but fixed in a direction perpendicular to this plane; and
- the other leg of each feeding roller arm is articulated to a slide by means of a universal joint, which slide is reciprocatable in relation to the frame in the direction of the tree feeding path to maintain a constant distance between the universal joints in the pivoting of the feeding roller arms.

In a preferred embodiment, each control means has an elongated guide groove, into which the pivot pin of the respective feeding roller arm extends with its said other end, the extent of the guide groove in a direction perpendicular to said plane being substantially equal to the diameter of the pivot pin and the guide groove extending perpendicular to this direction between two end limitations, between which the distance is substantially greater than the diameter of the pivot pin.

In this connection, the feeding roller arms are preferably pivotable back and forth between an initial position, in which said other end of each of the pivot pins is located at one end limitation of the respective guide groove and in which the feeding rollers are situated close to each other, and an outwardly located position, in which said other end of each of the pivot pins is located at said other end limitation of the respective guide groove and in which the feeding rollers are situated at a great distance from each other.

The feeding roller arms are advantageously pivotable beyond said outwardly located position to an extreme position, in which said other end of each of the pivot pins is located in a position between the end limitations of the respective guide groove and in which the feeding rollers are situated at a greater distance from each other than in the case where the feeding roller arms are in said outwardly located position, the components being so designed and dimensioned that in the pivoting of the feeding roller arms beyond said outwardly located position said other end of each of the pivot pins obtains a reverse direction of motion at said other end limitation of the guide groove when moving in the respective guide groove.

In a preferred embodiment, the frame has a linear guide groove extending in the direction of the tree feeding path, and the slide has a rib inserted into this groove to control the slide during its displacement in relation to the frame.

The feeding roller arms are preferably pivotable by means of a cylinder unit, whose cylinder is articulated to one of the feeding roller arms by means of a universal joint and whose piston rod is articulated to the other feeding roller arm by means of a universal joint.

The universal joints are advantageously ball joints.

The invention will now be described in detail with reference to the accompanying drawings.

Figure 1:
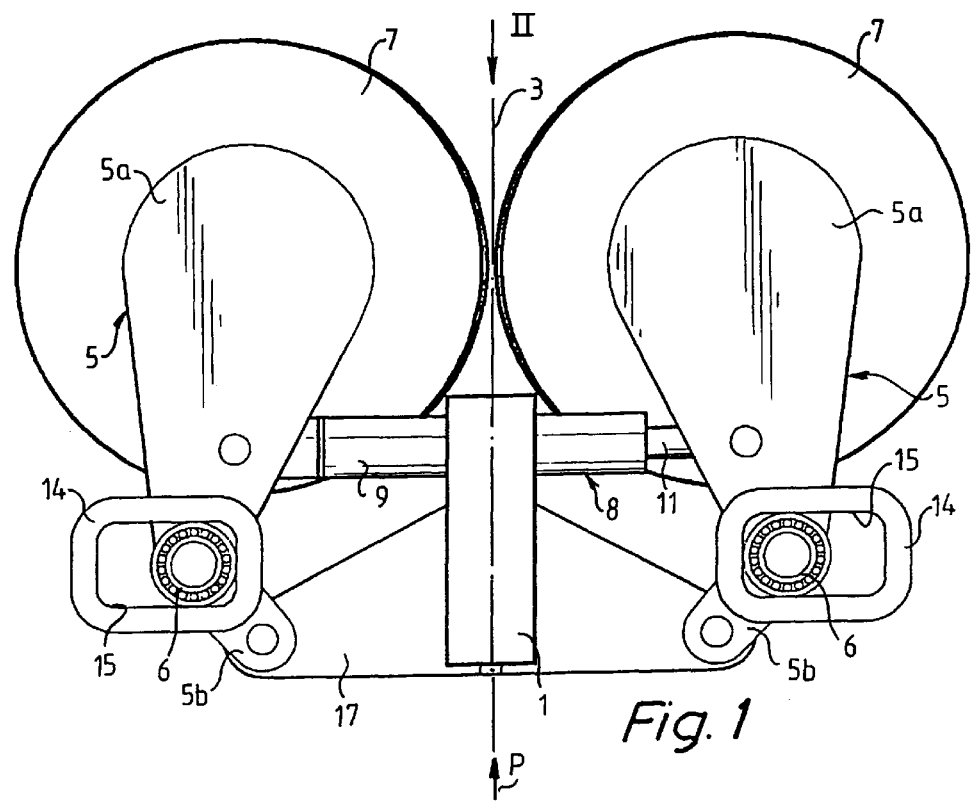
FIG. 1 is a schematic plan view showing a preferred embodiment of the single-grip harvester head according to the invention in an initial position.

The single-grip harvester head, which is shown in the drawings and which is intended for felling and processing trees, has a frame, of which only a few components 1 and 2 are shown in the drawings. The frame is to be mounted in a known manner on a forestry machine of a suitable kind. The frame defines a tree feeding path 3, which is indicated in the drawings (FIGS. 1, 3 and 5) by means of a dash-dot line only. In this connection, the tree feeding path 3 is the path along which a felled tree 4 is fed through the harvester head to be processed.

Figure 3:
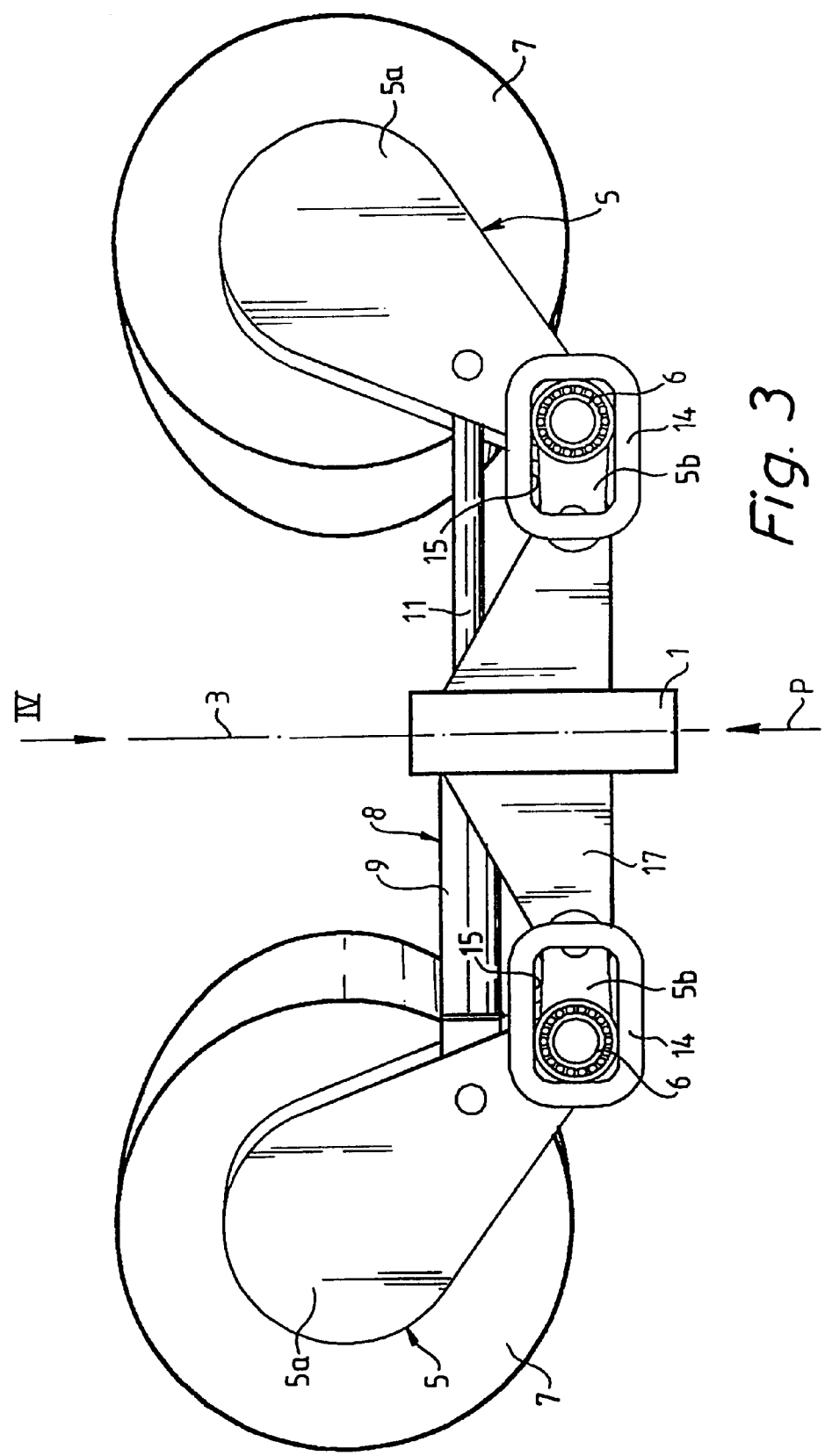
FIG. 3 is a schematic plan view showing the harvester head in an outwardly located position.
Figure 5:
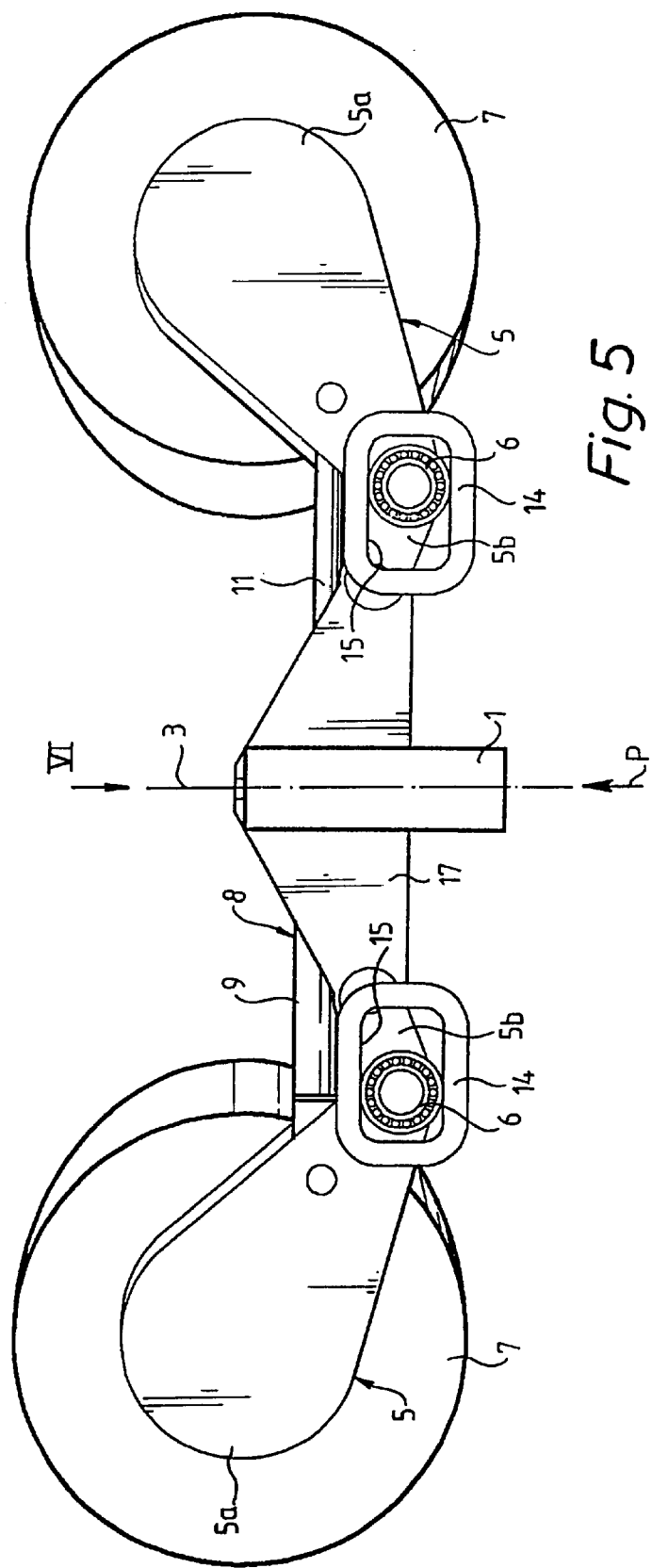
FIG. 5 is a schematic plan view showing the harvester head in an extreme position.

Before describing the invention in more detail, it can be noted that the single-grip harvester head is substantially mirror symmetrical in relation to the plane, which is perpendicular to the drawing plane of FIGS. 1, 3 and 5 and which contains the dash-dot line defining the tree feeding path 3, or more precisely its "centre line".

Further, the single-grip harvester head has two feeding roller arms 5, which are arranged one on each side of the tree feeding path 3 and which are pivotable in relation to the frame about respective pivot axes A1 each (FIGS. 2, 4 and 6) defined by a pivot pin 6. Both pivot axes A1 are located in a common plane perpendicular to the tree feeding path 3.

Each arm 5 supports a feeding roller 7, which is rotatable about a rotation axis A2 parallel to the pivot axis A1 of the arm. The feeding rollers 7, which are e.g. rubber rollers provided with chains, are supported and driven in a known manner, and therefore their bearing and driving means will not be described in more detail.

The feeding roller arms 5 are pivotable by means of a hydraulic unit 8, whose cylinder 9 is articulated to one of the feeding roller arms 5 by means of a ball joint 10 and whose piston rod 11 is articulated to the other feeding roller arm 5 by means of a ball joint 12. The arms 5 are pivotable back and forth between an initial position (FIGS. 1 and 2), in which the piston rod 11 is maximally retracted into the cylinder 9 and the feeding rollers 7 are situated close to each other, and an extreme position (FIGS. 5 and 6), in which the piston rod 11 is situated in a maximally extended position and the feeding rollers 7 are situated at a maximal distance from each other. By the pivoting of the arms 5, the feeding rollers 7 are thus movable towards or away from the tree feeding path 3 to be able to grip and feed trees 4 with various stem diameters along this path.

Each feeding roller arm 5 is formed as an angular lever having a long and a short lever leg 5a and 5b, respectively. The feeding roller 7 is supported at the free end of the long leg 5a. The pivot pin 6 is positioned in the angular area between the legs 5a and 5b.

Each of the pivot pins 6 is at one end articulated to the frame by means of a ball joint 13 at a location (at 2), which is fixed in relation to the frame. The ball joint 13 can, if desired, be replaced by a joint, by means of which the respective pivot pins 6. are articulate only about an axis perpendicular to said plane. Each of the pivot pins 6 is controlled at its other end, which here consists of a roller bearing, by a control means 14, which is fixedly connected to the frame in such a way that the pivot axis A1 is movable in said plane common to both pivot axes A1, but is fixed in a direction perpendicular to this plane. Each control means 14 consists of a substantially rectangular ring, whose centre opening forms an elongated guide groove 15, into which the pivot pin 6 of the respective feeding roller arm 5 extends with its other end (the roller bearing). The extent of the guide groove 15 in a direction parallel to the tree feeding path 3 is substantially equal to the diameter of the pivot pin 6 (the roller bearing), and perpendicular to this direction the groove 15 extends between two end limitations, which are formed by the short sides of the substantially rectangular ring and between which the distance is substantially greater than the diameter of the pivot pin 6 (the roller bearing).

The short leg 5b of each feeding roller arm 5 is articulated to a slide 17 by means of a ball joint 16, the slide being formed as a plate common to the two arms 5. The slide 17 is reciprocatable in the direction of the tree feeding path 3 in relation to the frame to maintain a constant distance between both ball joints 16 when the feeding roller arms 5 are pivoting. The slide 17 is provided with a straight rib 18 positioned in a groove 19 formed in the frame (at 1), which groove extends in the direction of the tree feeding path 3 to guide the slide 17 during its displacement in relation to the frame.

Figure 2:
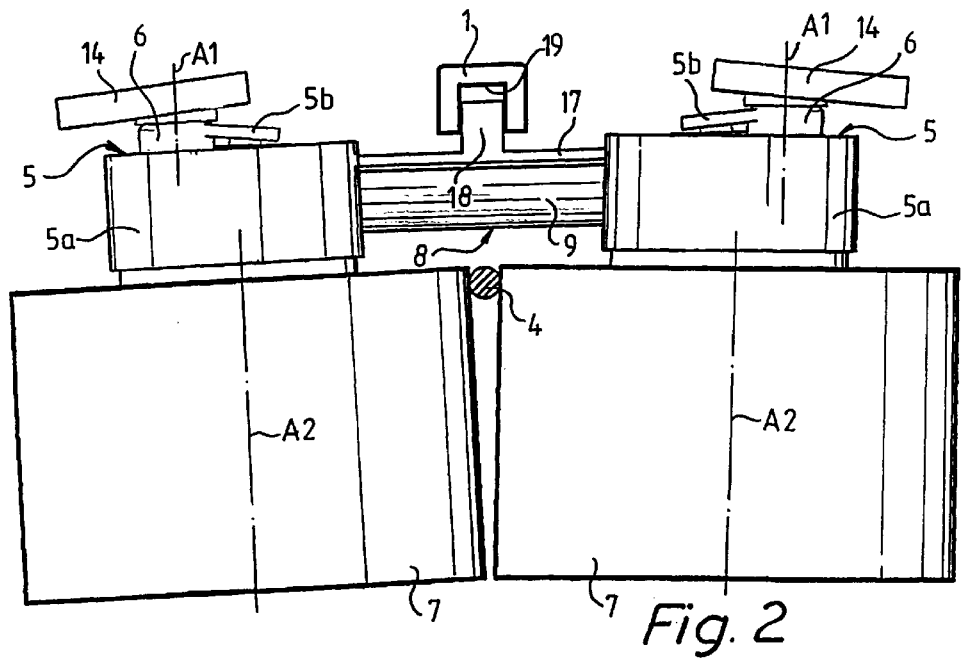
FIG. 2 shows the harvester head in the direction of the arrow II in FIG. 1.

When the feeding roller arms 5 are situated in the initial position shown in FIGS. 1 and 2, the feeding rollers 7 are, as mentioned above, situated close to each other to be able to grip and feed a tree stem 4 having a small diameter. In this initial position, the end of each of the two pivot pins 6, which projects into the associated guide groove 15, is located very close to the inner end limitation of the guide groove.

When the feeding roller arms 5 are pivoted outwards from the initial position, the slide 17, which forcibly maintains a constant distance between the two ball joints 16, is displaced forwards, i.e. in the feeding direction P of the tree 4, at the same time as the end of each of the pivot pins 6, which projects into the associated guide groove 15, is outwardly moved in the guide groove. Since the pivot pins 6 are articulately fixed at their other ends in relation to the frame, the pivot pins 6 are angularly adjusted so that the feeding rollers 7 can partly surround the tree 4.

Figure 4:
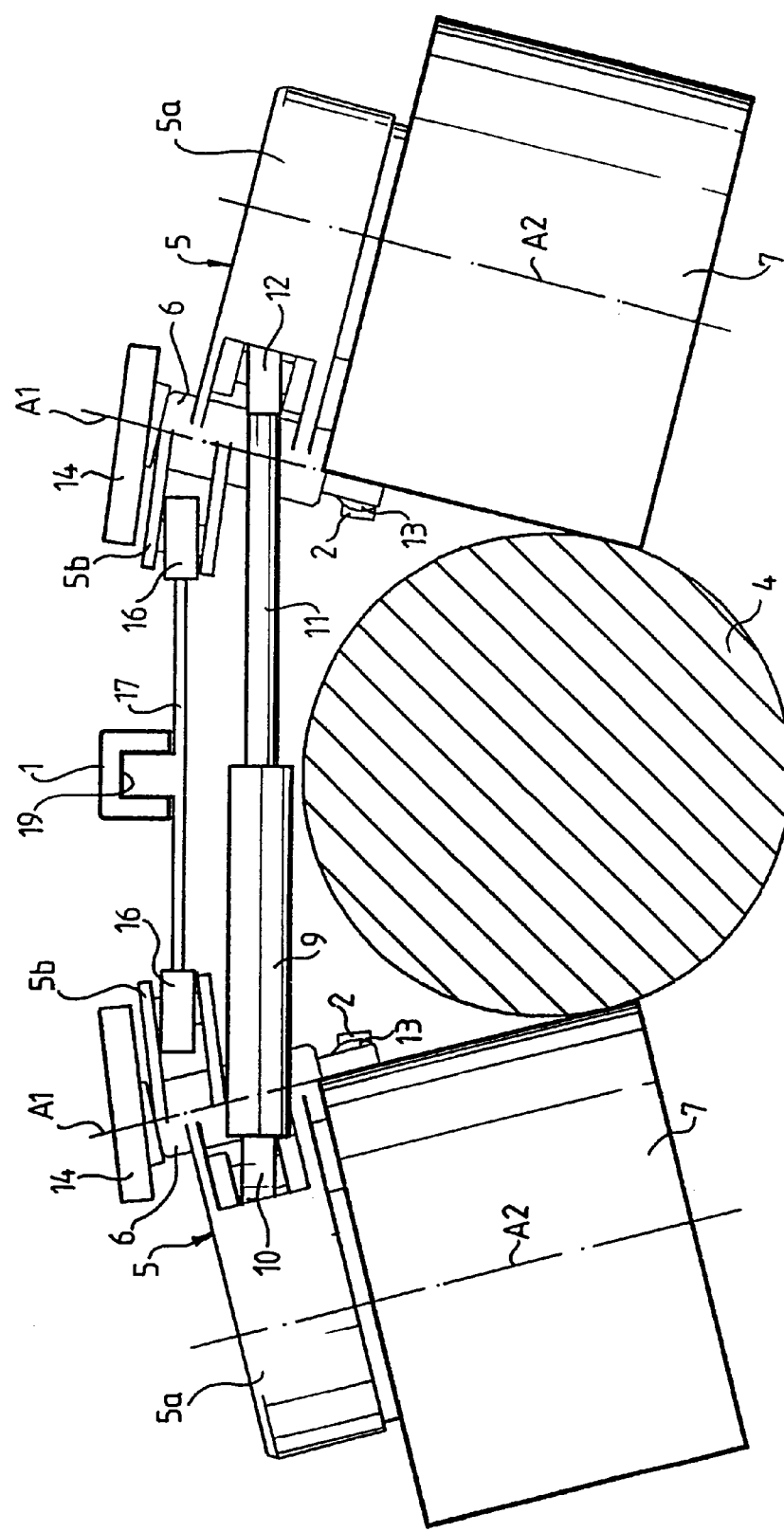
FIG. 4 shows the harvester head in the direction of the arrow IV in FIG. 3.

In the outwardly located position shown in FIGS. 3 and 4, the feeding rollers 7 are situated at a great distance from each other and the end of the pivot pins 6, which projects into the associated guide groove 15, is located very close to the outer end limitation of the guide groove. In this outwardly located position, the centres of the ball joints 16 are located in the same plane as the pivot axes A1, and thus the feeding rollers 7 are adjusted at a maximal angle in this position.

When the feeding roller arms 5 are pivoted outwards from the outwardly located position, shown in FIGS. 3 and 4, the slide 17 is displaced further forwards, whereas the end of each of the pivot pins 6, which projects into the associated guide groove 15, is now moved inwards in the guide groove, so that the angular adjustment of the feeding rollers 7 decreases.

Figure 6:
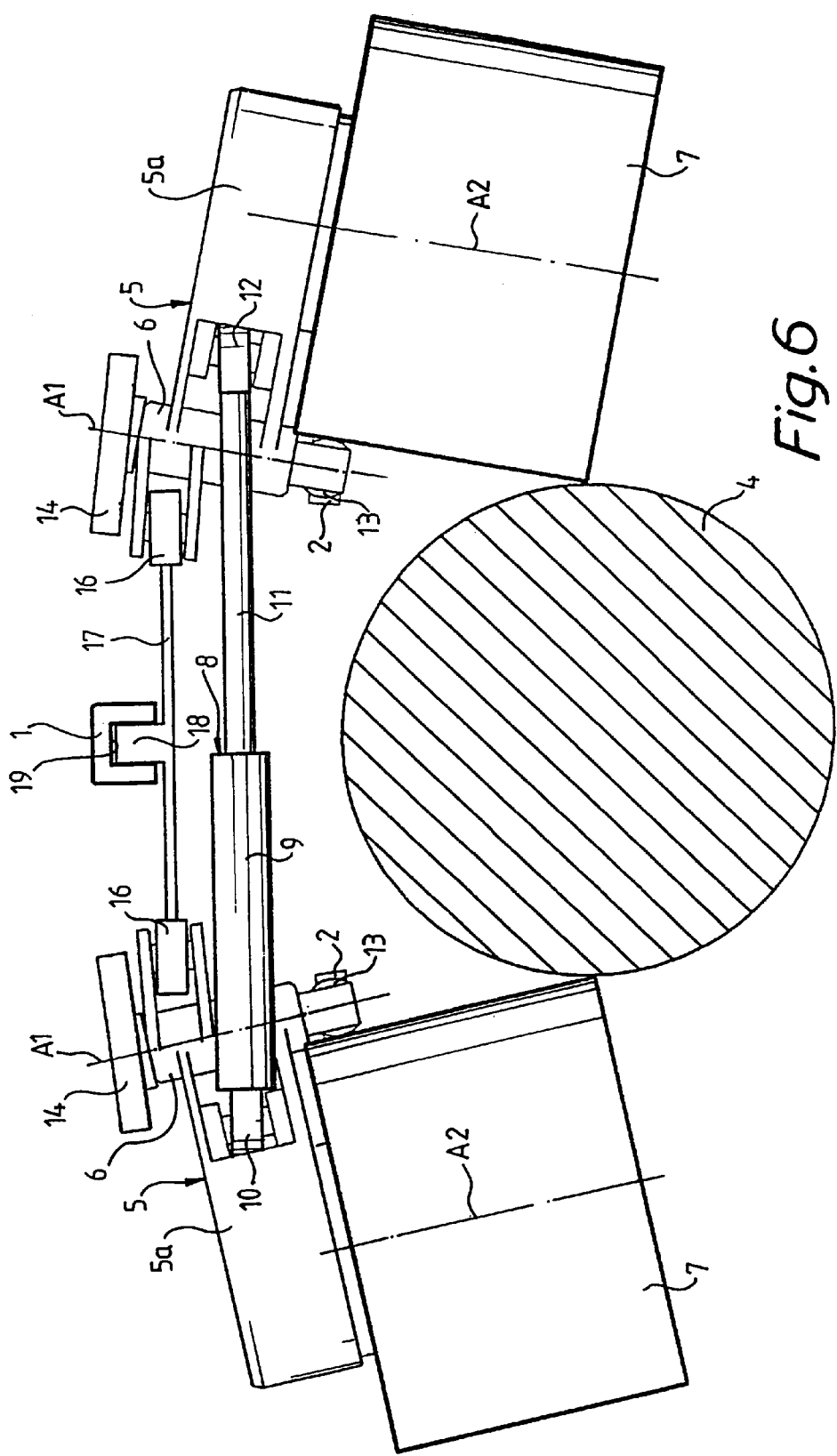
FIG. 6 shows the harvester head in the direction of the arrow VI in FIG. 5.

When the feeding roller arms 5 are situated in the extreme position shown in FIGS. 5 and 6, the feeding rollers 7 are situated at a greater distance from each other than in the outwardly located position (but with less angular adjustment) shown in FIGS. 3 and 4, and the piston rod 11 is, as mentioned above, in its maximally extended position.

What is claimed is:

1. A single-grip harvester head for felling and processing of trees (4), which comprises a frame, which is adapted to be mounted on a forestry machine and which defines a tree feeding path (3), two feeding roller arms (5) arranged on opposite sides of said path, each arm being pivotable in relation to the frame about a corresponding pivot axis (A1) defined by a respective pivot pin (6), and two feeding rollers (7), each supported by a respective one of said feeding roller arms (5) and rotatable about a corresponding rotation axis (A2) parallel to the pivot axis of the respective arm, the feeding rollers (7) being movable, by the pivoting of the feeding roller arms (5), towards or away from the tree feeding path (3) in order to be able to grip and feed trees (4) with various stem diameters along said path, characterised in that:

- each feeding roller arm (5) is formed as an angular lever having two lever legs (5a, 5b), the feeding roller (7) being supported at an end of one of the legs (5a) and the pivot pin (6) of the feeding roller arm (5) being positioned in the angular area joining the legs;
- the two pivot axes (A1) are located in a common plane perpendicular to the tree feeding path (3);
- the pivot pin (6) of each feeding roller arm (5) at one of its ends is articulated to the frame by a respective joint (13) about an axis perpendicular to said plane and at its other end is controlled by a respective control device (14) fixedly connected to the frame in such a way that the corresponding pivot axis (A1) is movable in said plane but fixed in a direction perpendicular to said plane; and
- the other leg (5b) of each feeding roller arm (5) is articulated to a slide (17) by a respective universal joint (16), which slide is reciprocatable along the tree feeding path (3) in relation to the frame to maintain a constant distance between the universal joints (16) during the pivoting of the feeding roller arms (5).

2. A harvester head according to claim 1, characterised in that each control device (14) has an elongated guide groove (15), into which the pivot pin (6) of the respective feeding roller arm (5) extends with its said other end, an extent of the guide groove in a direction perpendicular to said plane being substantially equal to a diameter of that pivot pin and an extent of the guide groove (15) in a direction parallel to said plane between two end limitations being substantially greater than said diameter of that pivot pin (6).

3. A harvester head according to claim 2, characterised in that the feeding roller arms (5) are pivotable back and forth between an initial position, in which said other end of each pivot pin (6) is located at one end limitation of the respective guide groove (15) and in which the feeding rollers (7) are situated relatively close to each other, and an outwardly located position, in which said other end of each pivot pin (6) is located at said other end limitation of the respective guide groove (15) and in which the feeding rollers (7) are situated relatively far from each other.

4. A harvester head according to claim 3, characterised in that the feeding roller arms (5) are pivotable beyond said outwardly located position to an extreme position, in which said other end of each pivot pin (6) is located in a position between the end limitations of the respective guide groove (15) and in which the feeding rollers (7) are situated at a greater distance from each other than in said outwardly located position.

5. A harvester head according to claim 1, characterised in that the frame has a linear guide groove (19) extending in the direction of the tree feeding path (3), and that the slide (17) has a rib (18) inserted into this groove (19) to guide the slide (17) during its displacement in relation to the frame.

6. A harvester head according to claim 1, characterised in that the feeding roller arms (5) are pivotable by a cylinder unit (8) comprising a cylinder (9) articulated to one of the feeding roller arms by a universal joint (10) and a piston rod (11) articulated to the other feeding roller arm by a universal joint (12).

7. A harvester head according to claim 6, characterised in that all of the universal joints (10, 12, 16) are ball joints.

* * * * *